Jan 6, 1931.   A. J. SORENSEN   1,787,550
ELECTRICAL APPARATUS
Filed Aug. 30, 1928   2 Sheets-Sheet 1

INVENTOR:
A. J. Sorensen,
by A. L. Vernill
His Attorney

Jan 6, 1931.  A. J. SORENSEN  1,787,550
ELECTRICAL APPARATUS
Filed Aug. 30, 1928   2 Sheets-Sheet 2

INVENTOR:
A. J. Sorensen,
by A. L. Vencill,
His Attorney

Patented Jan. 6, 1931

1,787,550

UNITED STATES PATENT OFFICE

ANDREW J. SORENSEN, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL APPARATUS

Application filed August 30, 1928. Serial No. 303,038.

My invention relates to electrical apparatus, and has for an object the provision of novel and improved means for selectively controlling two magnet windings over a pair of conductors, so that at times the first only of said windings is energized, at other times the second only of said windings is energized, at other times both of said windings are energized, and at still other times both of said windings are de-energized.

I will describe four forms of apparatus embodying my invention, and will then point out the novel features thereof in the claim.

Figure 1:
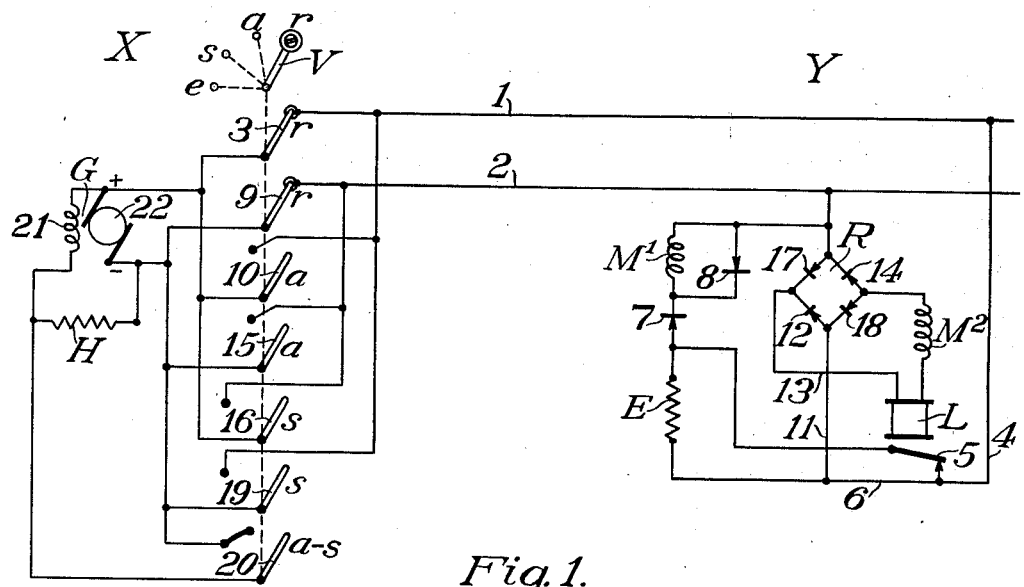
Figure 2:
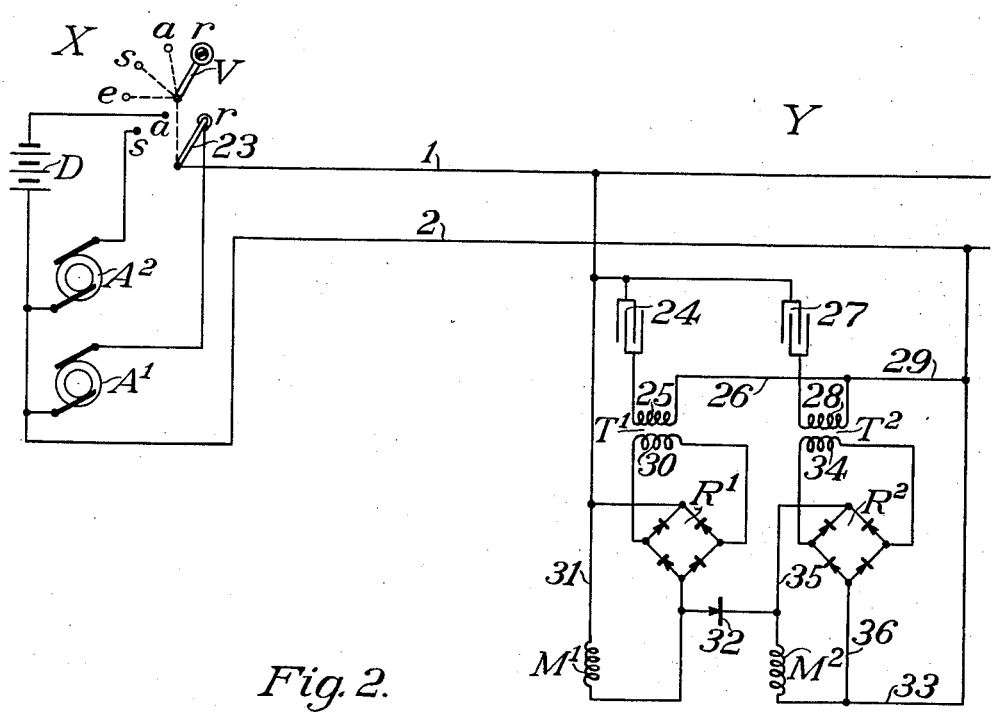
Figure 3:
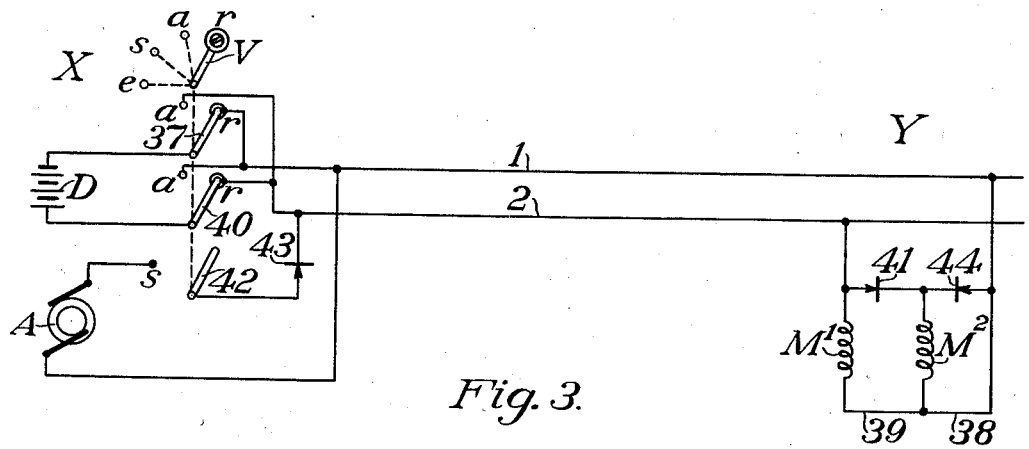
Figure 4:
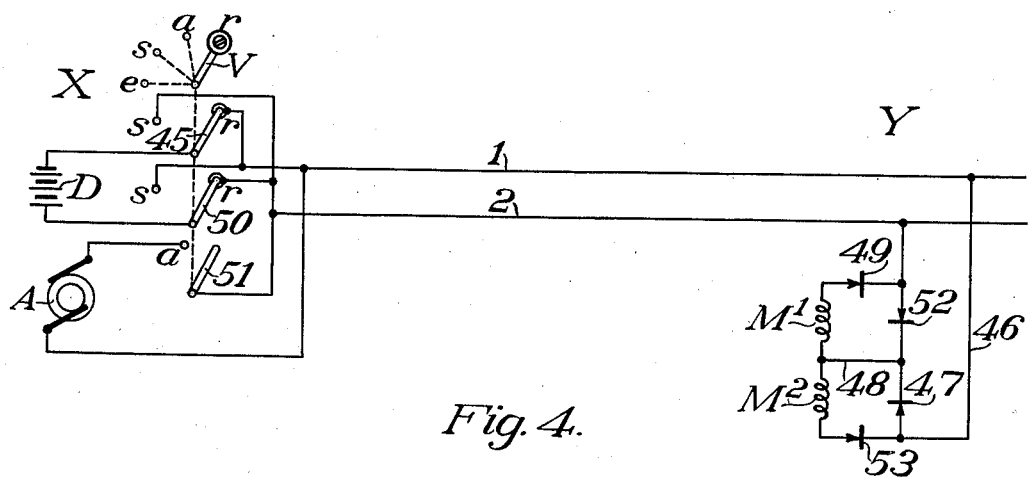

In the accompanying drawings, Fig. 1 is a diagrammatic view showing one form of apparatus embodying my invention, wherein direct current at a given voltage and of one polarity only, or direct current at a higher voltage and of normal or reverse polarity, is at times supplied to said conductors. Fig. 2 is a view showing a modified form of the apparatus of Fig. 1, also embodying my invention, wherein direct current of one polarity only, or alternating current of one or the other of two different frequencies, is at times supplied to said conductors. Fig. 3 is a view showing another modified form of the apparatus of Fig. 1, also embodying my invention, wherein direct current of normal or reverse polarity, or alternating current of one frequency, is at times supplied to said conductors. Fig. 4 is still another modified form of the apparatus of Fig. 1, also embodying my invention, wherein direct current of normal or reverse polarity, or alternating current, is at times supplied to said conductors.

Similar reference characters refer to similar parts in each of the four views.

Referring first to Fig. 1, the reference characters X and Y designate a transmitting station and a receiving station, respectively, these stations being connected by two conductors 1 and 2.

Located at the transmitting station X is a lever V having four positions $e$, $s$, $a$, and $r$. Lever V, when moved to its $r$ position closes contacts 3 and 9, when moved to its $a$ position closes contacts 10 and 15, and when moved to its $s$ position closes contacts 16 and
19. Contact 20 is closed while lever V is in its $a$ or $s$ positions, or at any point intermediate between these two positions. A direct current source, such as generator G, at times supplies current at a first voltage and at times supplies current at a second voltage which is higher than said first voltage. The first voltage is provided while an impedance H is in series with field winding 21 of generator G, and the second voltage is provided when contact 20 is closed, forming a branch path around impedance H.

Located at the receiving station Y is a magnet having a winding $M^1$ and so proportioned as to respond to the current supplied by either the first or the second voltage of generator G. A magnet having a winding $M^2$, also at receiving station Y, is so proportioned as to respond to current supplied by the second voltage, but not to current supplied by the first voltage. A relay L, similarly to the magnet having winding $M^2$, responds to current supplied by the second voltage but not to current supplied by the first voltage. Each of the asymmetric units 7 and 8 may be similar to those disclosed and claimed in Letters Patent of the United States, No. 1,640,335, granted to L. O. Grondahl, August 23, 1927. Rectifier R may be made up of a plurality of units of the same character. The unit 7 prevents the flow of current from wire 2 through magnet winding $M^1$. Unit 8 is used to by-pass around magnet winding $M^1$ any current which may flow from wire 2 through unit 7 in the event of unit 7 becoming partially conducting in this direction.

With lever V in its $r$ position, impedance H is in series with field winding 21 since contact 20 is open, and therefore the first or lower voltage is generated by source G. Current is now supplied at this voltage from the positive terminal of source G, through contact 3, wires 1 and 4, back contact 5 of relay L, asymmetric unit 7, magnet winding $M^1$, wire 2, and contact 9 to the negative terminal of source G. A second main path also permits current to flow from wire 1, passing through wires 4, 6, and 11, unit 12 of rectifier R, wire 13, winding of relay L, magnet winding $M^2$, and unit 14 of rectifier R to wire 2. The current supplied by the first voltage over the first path, operates the magnet having winding $M^1$, but the current supplied over the second path, by this voltage, is insufficient to operate either the magnet having winding $M^2$ or relay L.

If lever V is moved to its $a$ position, contact 20 becomes closed, by-passing, around impedance winding H, the current flowing through field winding 21, and generator G provides the second or higher voltage. Current flows through magnet windings $M^1$ and $M^2$ and relay L by the paths previously traced, except that instead of passing through contacts 3 and 9, the current flowing in these circuits now goes through contacts 10 and 15. Relay L and the magnet having winding $M^2$, as well as the magnet having winding $M^1$ are now operated. Relay L, upon being operated, opens its contact 5 thus causing current to flow by a branch path from wire 4, through wire 6, and impedance E to unit 7, impedance E reducing the current, flowing through winding $M^1$, to a value approximating that of the current supplied to winding $M^1$ with lever V in its $r$ position.

When lever V is moved to its $s$ position, contact 20 is closed and current at the higher voltage is supplied to wires 1 and 2 by a path passing from the positive terminal of generator G, through contact 16 of lever V, wire 2, unit 17 of rectifier R, wire 13, winding of relay L, magnet winding $M^2$, unit 18 of rectifier R, wires 11, 6, 4, and 1, and contact 19 of lever V to the negative terminal of generator G. Magnet winding $M^2$ and relay L are therefore energized by current flowing in the same direction as with lever V in its $a$ position. Asymmetric unit 7, however, now prevents the flow of current from wire 2 through magnet winding $M^1$, and therefore magnet winding $M^1$ is de-energized.

From the foregoing, it follows that with lever V in its $r$ position the magnet having winding $M^1$ is alone operated, that with lever V in its $a$ position both magnets having windings $M^1$ and $M^2$ respectively are operated, and with lever V in its $s$ position the magnet having winding $M^2$ is alone operated.

Referring now to Fig. 2, conductors 1 and 2 are here at times supplied with direct current of one polarity only by a source such as battery D, at other times by alternating current of a given frequency from alternating current source $A^1$, and at still other times by alternating current of a second frequency from alternating current source $A^2$. A path across conductors 1 and 2, at receiving station Y, includes condenser 24 and the primary winding 25 of a transformer $T^1$ tuned to the frequency of the alternating current supplied by source $A^1$. A second path across conductors 1 and 2 includes condenser 27 and primary winding 28 of a transformer $T^2$ tuned to the frequency of the current supplied by source $A^2$.

Current of the first frequency is supplied by source $A^1$, through contact 23 closed while lever V is in its $r$ position, wire 1, condenser 24, primary winding 25, wires 26, 29, and 2, back to source $A^1$. Current is in turn supplied by secondary winding 30 of transformer $T^1$ to rectifier $R^1$, which now energizes magnet winding $M^1$ by current flowing from rectifier $R^1$, through wire 31, and magnet winding $M^1$ back to rectifier $R^1$.

With lever V in its $a$ position, direct current is supplied by battery D, through contact 23 closed in its $a$ position, wires 1 and 31, magnet winding $M^1$, asymmetric unit 32, magnet winding $M^2$, and wires 33 and 2 back to battery D, energizing magnet windings $M^1$ and $M^2$. Condensers 24 and 27 prevent the flow of direct current through primary windings 25 and 28, respectively.

If lever V is moved to its $s$ position, alternating current of the second frequency flows from source $A^2$, through contact 23 closed in its $s$ position, wire 1, condenser 27, primary winding 28, and wires 29 and 2 back to source $A^2$. Secondary winding 34 of transformer $T^2$ in turn supplies currrent to rectifier $R^2$, which now energizes magnet winding $M^2$ by current flowing from rectifier $R^2$, through wire 35, magnet winding $M^2$, and wire 36 back to rectifier $R^2$.

The impedance of magnet windings $M^1$ and $M^2$ is great enough to prevent the flow of current from either source $A^1$ or $A^2$, directly through these magnet windings, sufficient to operate the respective magnets. The impedance of windings $M^1$ and $M^2$ also prevents the shunting of current around the primary winding of transformers $T^1$ or $T^2$ to such an extent as to interfere with the energization of magnet winding $M^1$ or $M^2$ from rectifiers $R^1$ or $R^2$, respectively.

Asymmetric unit 32 prevents direct current from flowing from rectifier $R^1$, through wire 1, contact 23 in its $r$ position, source $A^1$, wires 2 and 33, and rectifier $R^2$ in multiple with magnet winding $M^2$, back to rectifier $R^1$. Asymmetric unit 32 similarly prevents the flow of direct current from rectifier $R^2$ through rectifier $R^1$ in multiple with magnet winding $M^1$.

It follows that, as in the arrangement of Fig. 1, with lever V in its $r$ position, the magnet having winding $M^1$ is alone operated, that with lever V in its $a$ position both magnets having windings $M^1$ and $M^2$ respectively are operated, and with lever V in its $s$ position the magnet having winding $M^2$ is alone operated.

Referring next to Fig. 3, conductors 1 and 2 are here supplied with direct current of normal or reverse polarity, by a source such as battery D, or with alternating current by alternating current source A. Magnet winding $M^1$ is so proportioned as to have a high impedance whereas magnet winding M² has a low impedance.

Direct current of normal polarity flows from battery D, through contact 37 closed with lever V in its r position, wires 1, 38, and 39, magnet winding M¹, wire 2, and contact 40 of lever V closed with lever V in its r position, back to battery D. Asymmetric unit 41 prevents the flow of current from wire 1 through magnet winding M².

When lever V is moved to its a position, current flows from battery D, through contact 37 closed in the a position, wire 2, magnet winding M¹, wires 39, 38, and 1, and contact 40 closed in its a position, back to battery D. Current also flows by a branch path passing from wire 2, through asymmetric unit 41, and magnet winding M² to wire 38.

If lever V is moved to its s position, current is supplied by alternating current source A, through contact 42, asymmetric unit 43, wire 2, asymmetric unit 41, magnet winding M², and wires 38 and 1 back to source A. Magnet winding M² now becomes energized by the half waves of alternating current which are permitted to flow by units 41 and 43. The high impedance of magnet winding M¹ prevents similar energization of this winding. The purpose of asymmetric unit 44 is to by-pass, around magnet winding M², any current which may flow from wire 1 through asymmetric unit 41 to wire 2, if asymmetric unit 41 should for any reason become partially conducting in this direction.

It follows that, as with Figs. 1 and 2, magnet winding M¹ only is energized while lever V is in its r position, both magnet windings M¹ and M² are energized while lever V is in its a position, and magnet winding M² only is energized while lever V is in its s position.

Referring lastly to Fig. 4, conductors 1 and 2 are here supplied with direct current of normal or reverse polarity from a source such as battery D, or with alternating current from source A. Whereas, in Figs. 1, 2, and 3, the simultaneous energization of windings M¹ and M² is effected by current from a direct current source, in Fig. 4 windings M¹ and M² are contemporaneously energized by current from alternating current source A, the half waves of current of one polarity flowing through magnet winding M¹ and the half waves of opposite polarity flowing through magnet winding M². With lever V in its r position, current flows from battery D, through contact 45, wires 1 and 46, asymmetric unit 47, wire 48, magnet winding M¹, asymmetric unit 49, wire 2, and contact 50 of lever V to battery D. With lever V in its a position, alternating current half waves of one polarity flow from a source A, through contact 51, wire 2, asymmetric unit 52, wire 48, magnet winding M², asymmetric unit 53, and wires 46 and 1 back to source A. Half waves of the opposite polarity flow in the opposite direction from source A, through wires 1 and 46, asymmetric unit 47, wire 48, magnet winding M¹, asymmetric unit 49, wire 2, and contact 51 back to source A. With lever V in its s position, direct current flows from battery D, through contact 45, wire 2, asymmetric unit 52, wire 48, magnet winding M², asymmetric unit 53, wires 46 and 1, and contact 50 back to battery D. As with Figs. 1, 2, and 3, the operation of the apparatus in Fig. 4 is, therefore, such that with lever V in its r position magnet winding M¹ only is energized, with lever V in its a position both magnet windings M¹ and M² are energized, and with lever V in its s position magnet winding M² only is energized.

It will be observed that with the arrangements of Figs. 1, 2, 3, and 4, apparatus embodying my invention is particularly suitable for, though not limited to, use in connection with the control of the brakes on a railway train. When used in this manner, the apparatus shown at station X will usually be located on the locomotive, whereas the apparatus shown at station Y will be located on each car of the train. The engineer's brake handle can here be used to perform the functions of lever V, position r of lever V corresponding to the running position of the brake handle, position a of lever V corresponding to the lap position of the brake handle, position s of lever V corresponding to the service application position of the brake handle, and position e of lever V corresponding to the emergency position of the brake handle. It will be noted that, with lever V in the e position, both magnets M¹ and M² are deenergized. When my invention, herein shown and described, is used in connection with the control of the brakes of a railway train, wires 1 and 2 will extend throughout the train. The magnet windings M¹ and M² may be used to control the brakes in any suitable manner such, for example, as already described in comparing the positions of lever V with those of the brake handle. The apparatus for the control of the brakes forms no part of my present invention and is therefore omitted from the drawing.

Although I have herein shown and described only four forms of apparatus embodying my invention, it is understood that various changes and modifications may be made therein within the scope of the appended claim without departing from the spirit and scope of my invention.

Having thus described my invention, what I claim is:

In combination, a first and a second conductor, means for supplying direct current of one polarity only at a given voltage to said first conductor and thence by several paths to said second conductor, means for supplying said conductors with direct current of normal or reverse polarity at a second given voltage which is higher than said first voltage, a first magnet winding responsive to current at said first voltage as well as to current at said second voltage, a second magnet winding responsive to current at said second voltage but not to current at said first voltage, a relay responsive to current at said second voltage but not to current at said first voltage, a main path for current to flow from said first conductor through a back contact of said relay and a first asymmetric unit in the low resistance direction thereof as well as said first magnet winding in series to said second conductor, a branch path including an impedance unit in multiple with said back contact, a second branch path including a second asymmetric unit so connected in multiple with said first magnet winding as to offer high resistance to current flowing from said first to said second conductor but low resistance to current flowing in the opposite direction, a second main path for current to flow from said first conductor through a third asymmetric unit in the low resistance direction thereof and the winding of said relay as well as said second magnet winding in series and thence through a fourth asymmetric unit in the low resistance direction thereof to said second conductor, and a third main path for current to flow from said second conductor through a fifth asymmetric unit in the low resistance direction thereof and the winding of said relay as well as said second magnet winding in series and thence through a sixth asymmetric unit in the low resistance direction thereof to said first conductor.

In testimony whereof I affix my signature.

ANDREW J. SORENSEN.